J. K. ELDERKIN, Jr.
GENERATOR AND STORAGE BATTERY SYSTEM FOR LIGHTING, &c.
APPLICATION FILED JAN. 24, 1918.
1,320,747.
Patented Nov. 4, 1919.
3 SHEETS—SHEET 1.
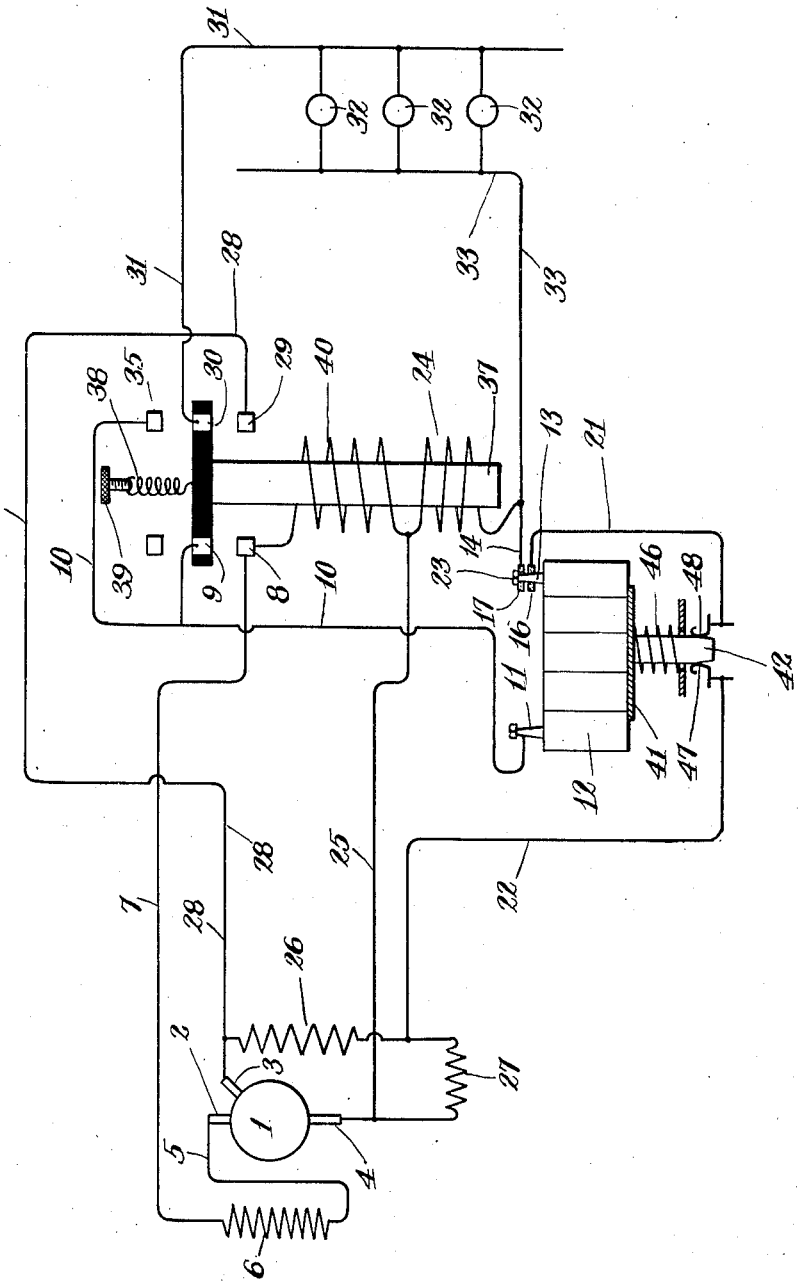

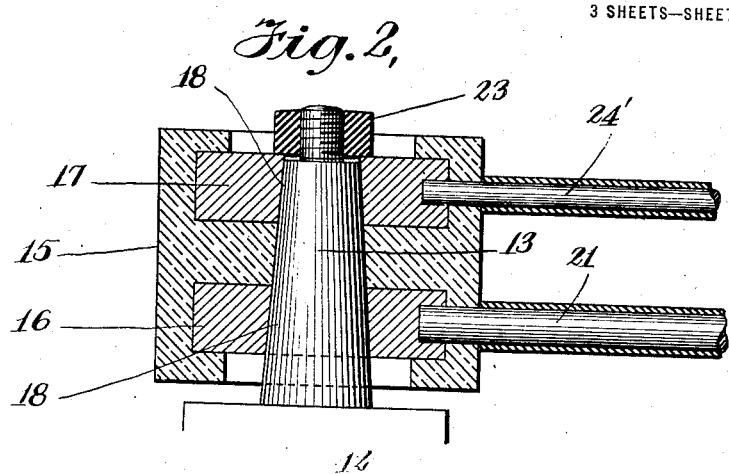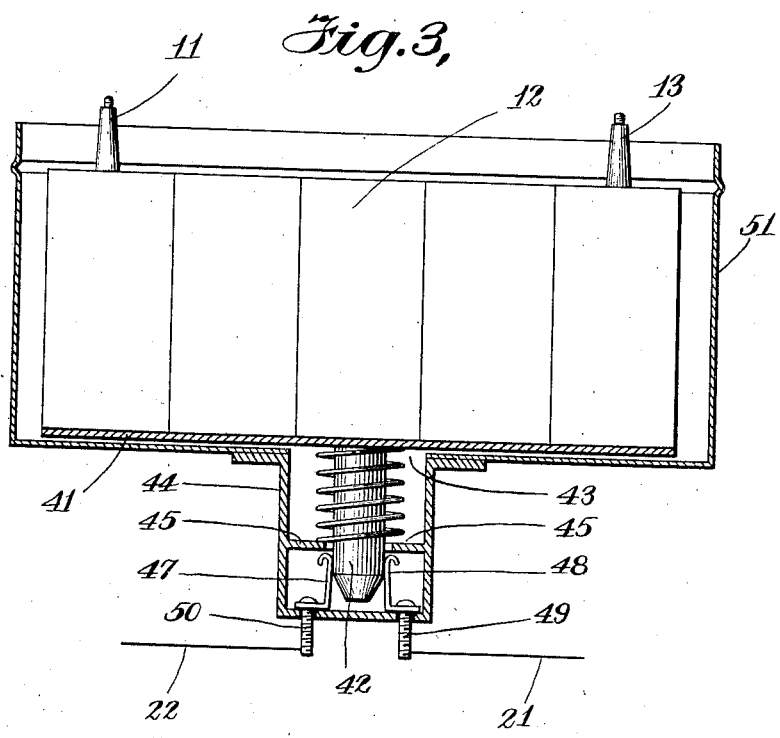

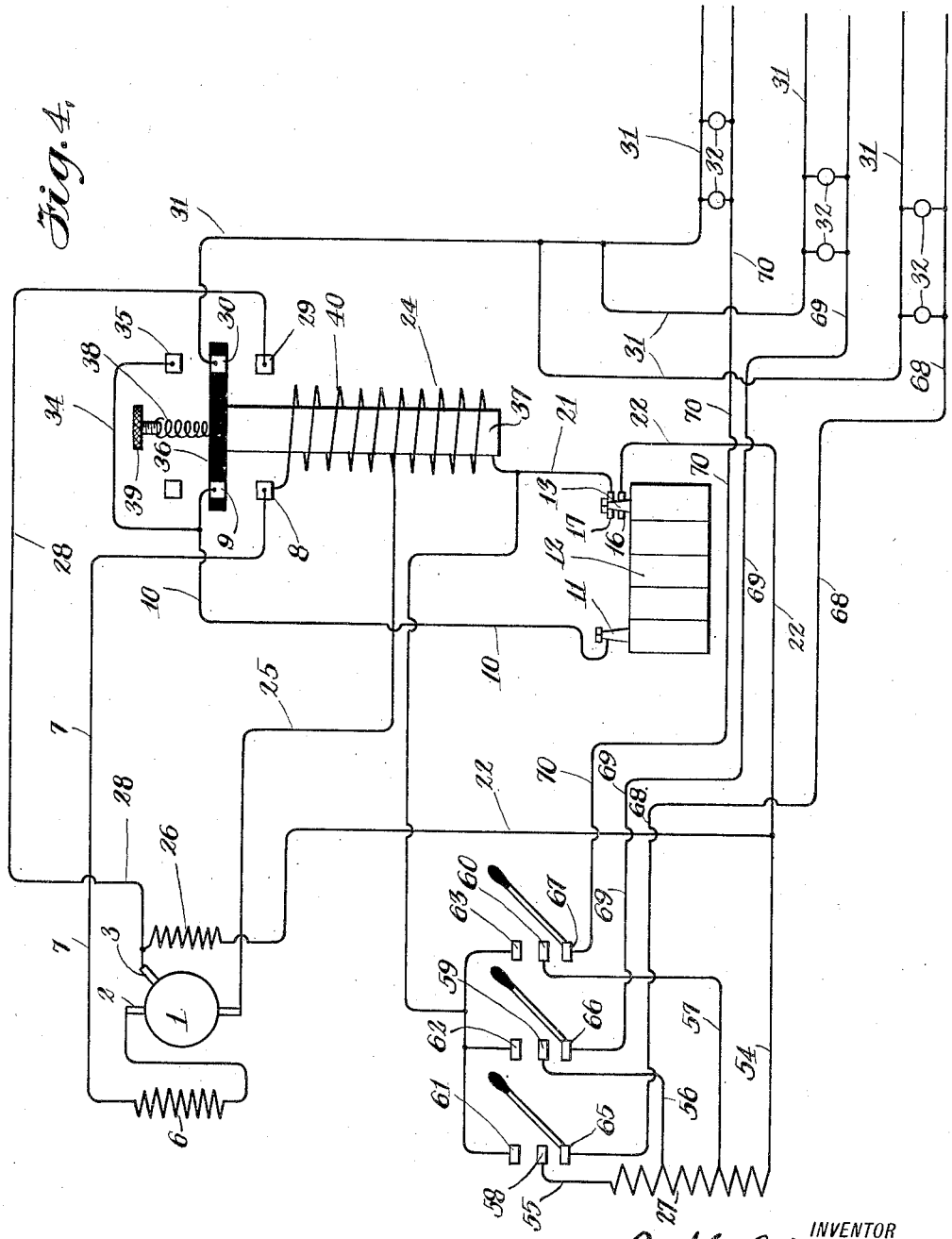

UNITED STATES PATENT OFFICE.

JAMES KNOX ELDERKIN, JR., OF NEWARK, NEW JERSEY.

GENERATOR AND STORAGE-BATTERY SYSTEM FOR LIGHTING, &C.

1,320,747.  Specification of Letters Patent.  Patented Nov. 4, 1919.

Application filed January 24, 1918. Serial No. 213,498.

*To all whom it may concern:*

Be it known that I, JAMES KNOX ELDERKIN, Jr., a citizen of the United States, and resident of Newark, in the county of Essex and State of New Jersey, have invented certain new and useful Improvements in Generator and Storage - Battery Systems for Lighting, &c., of which the following is a specification.

My invention relates more particularly to systems of the above class intended for use under conditions where the battery cells are few in number and hence easily portable and likely to be removed from the circuit for various purposes, as for instance, systems used on launches, automobiles, trucks, etc., where the storage batteries are made up in units which are small and easily portable. Such batteries are often removed, sometimes for purposes of repair or renewal, sometimes for purposes of fully charging or recharging on a service circuit and sometimes, particularly in the case of military trucks, for use as sources of electrical energy at some distant point; as for instance, operating lamps in trenches and dugouts.

In such systems, the generator is commonly driven from the automobile motor and when the generator is driven above a predetermined minimum speed, a relay operates to automatically connect it for simultaneously supplying current to the consumption circuit and to the storage battery in parallel. The generator is usually regulated to proper voltage for thus supplying the consumption circuit and for charging the storage battery at the same time. When the battery is removed from the circuit, however, this regulation does not prevent the generator voltage from being increased greatly as a result of the reduction of the load due to removal of the battery, and this increase in voltage is likely to result in burning out the lamps, or the field windings of the generator, or both.

The primary object of my invention is to obviate this danger by simple and automatic means. To this end I provide special means whereby the supply of current from the generator to the consumption circuit is normally limited to the capacity of the consumption circuit alone, and, in combination with the above, means whereby, when the storage battery is put in place and properly connected for operation in the system, the current regulating or limiting means will be short-circuited or otherwise rendered inoperative so that maximum generator capacity will then become available to adequately supply both the storage battery and the consumption circuit.

The preferred means for limiting current flowing from the generator to the consumption circuit is a suitable resistance arranged in series with the shunt field winding of the generator and the preferred means for rendering this resistance inoperative may be either a special terminal connection for the battery or a switch operated by the weight of the battery or both. These parts are so organized that when the battery is placed in its proper position on the truck or other vehicle and is properly connected to the charging and lighting system, the resistance in the shunt field is short-circuited, thus lowering the resistance of the field circuit and increasing the amount of current in the field thereby causing the generator to operate at maximum efficiency, and thus supply adequate energy for both the lamp circuit and the battery circuit. Opening the short circuit, however, by lifting the battery from its place or by disconnecting the special terminal, puts the resistance again in series with the field, thereby decreasing the current in the field and decreasing the voltage of the generator output. The amount of the resistance is predetermined with reference to the generator capacity and with reference to the requirements of the lamp circuit, so as to prevent the generator current in the lamp circuit from exceeding the limits of safe working when the battery load is removed.

The circuit for controlling the maximum current production may be controlled independently or interdependently from as many points as desired, so that maximum efficiency operation may be made dependent on proper positioning or connecting up of as many different elements of the system as may be desired. Also where there is only one control it may be at either the negative terminal or at the positive terminal or it may be at the battery support switch only.

Where there are two or more consumption circuits arranged in parallel and operated by separate switches so that the total consumption circuit load is likely to be varied within wide limits, I prefer to divide and apportion the shunt field resistance among the several consumption circuits and arrange the several switches so that when the switches are open, their respective portions of the resistance will be open circuited, and when the switches are operated to close their respective consumption circuits, their respective portions of the resistance will be close circuited. These divided portions of the resistance are like the single resistance above described in that they will all be short circuited when the battery is connected in place, the difference being that when the battery is removed the shunt field will be open circuited until one or more of the consumption circuit switches are closed, and the closing of any one switch, close circuits the shunt field through enough resistance to give proper field excitation for producing voltage suitable for that particular consumption circuit alone. If the switches are arranged, as is commonly the case on automobiles, so that the successive consumption circuits are thrown in a fixed one-two-three order of succession, the first switch contact may close circuit the field shunt through the entire resistance, the second switch contact may then short-circuit a suitable portion of this resistance and the third switch contact a still greater portion of the resistance. It will be obvious, however, that if the switches are entirely independent so that any one of the several circuits may be closed independently of the others, the several resistances should be connected in parallel portions of the branches leading to each switch so that closing of any one switch will always let through the right amount of shunt field current required for its own circuit independently of the amounts of shunt field current that may be let through by the other resistance when their circuits are closed.

My invention will be more fully understood from the following detailed description in connection with the accompanying drawings, in which Figure 1 is a diagram showing a generator storage battery and lighting system having both the special terminal and the automatic switch for short circuiting the resistance in the shunt field circuit;

Fig. 2 is a vertical section showing the construction of my special terminal as applied to one of the battery poles, preferably the negative pole for short circuiting the shunt field resistance;

Fig. 3 is a similar view of my special switch adapted to be closed by the weight of the battery for the same purpose; and Fig. 4 is a diagram showing a circuit similar to Fig. 1 similarly protected by the special battery terminal but without the automatic switch operated by the weight of the battery and with the shunt field resistance divided and apportioned to a plurality of consumption circuits.

In these drawings, Fig. 1 shows a generator, storage battery and lighting system suitable for use on automobiles and having the lighting or other consumption circuit protected in accordance with my present invention.

The generator is adapted to be driven from any suitable source of power, not shown, as for instance, the engine of a motor vehicle on which the system is used. The generator is diagrammatically indicated as comprising the commutator 1, having the main brushes 2, 4 bearing thereon at diametrically opposite points, so as to be energized at the full voltage derivable from all of the windings of the armature and having a third brush 3 angularly displaced from diametric relation with respect to the main brush 4 so that the circuit connected across 3, 4 will be energized by the lesser voltage derived from a part only of the windings of the armature.

The field of the generator is energized by the currents flowing through the shunt field coil 26 and the energizing of the field by this coil is variably decreased by the series bucking coil 6 which becomes more and more effective as the speed of the generator increases and hence tends to limit the current of the generator thereby rendering the current approximately constant throughout a very considerable range of varying generator speeds.

Ths main brush 2 is connected through wire 5 bucking field coil 6, wire 7, contact 8, high resistance relay coil 40 and return wire 25 to the other main brush 4. Current flowing in this circuit through the solenoid coil 40 magnetizes the core 37 of the relay and at a certain predetermined speed of the generator, the current will become sufficient for drawing the core downward against the pull of spring 38, the tension of which may be adjusted by screw 39. The spring will be adjusted so that the pull will not bring the switch terminal 9 in contact with main circuit contact 8 until the generator speed gives a current of voltage sufficient for charging the storage battery. When the critical speed is reached, circuit is closed through contacts 8 and 9 thereby permitting main circuit current to flow in parallel with coil 40, through wire 10, terminal 11, storage battery 12, binding post 13, special terminal 16, supplemental relay coil 24 and thence through the main circuit return wire 25 to the other main brush 4. Operating the relay to close circuit through contacts 8, 9, also closes circuit through contacts 29, 30 so that current flows from third brush 3 through wire 28, contacts 29, 30, consumption circuit wire 31, parallel connected lamps or other consumption devices 32, return wire 33, and wire 21, thence back through the supplemental relay coil 24 and return wire 25 to main brush 4.

By means of the circuit connections above described, it will be noted that the storage battery 12 is energized by the full voltage available through main brushes 2, 4 while the consumption circuit is energized by the lesser voltage derived through the third brush 3 and main terminal 4. This difference in voltage is desirable because it is a characteristic of storage batteries that they require charging current of higher voltage than the voltage which they will give on discharge and as the primary purpose of the storage battery is to supply the consumption circuit with current of suitable voltage during periods when the generator is being revolved at speeds below the minimum required to give sufficient voltage for charging the battery and supplying the consumption circuit, the voltage of the battery charging circuit from the generator should be considerably higher than the generator circuit for direct supply of the consumption circuit.

The supplemental relay coil 24 is wound in such direction that current returning to the generator from either the storage battery or the consumption circuit will cause it to pull the relay core 37 in the same direction as the main coil 40, this assisting in holding the relay terminals 8, 9 and 29, 30 in firm contact. When the generator speed falls off so that the voltage of the current generated thereby falls below the opposing voltage of the battery, current tends to flow in the reverse direction from the battery through this coil 24. Consequently, instead of assisting coil 40, it acts in opposition to it, thus weakening the solenoid pull on core 37 and permitting spring 38 to draw the same upward thus breaking circuit through contacts 8, 9 and 29, 30 and establishing circuit through contacts 30, 35. This opens both circuits of the generator and closes circuit from the storage battery through the above described consumption circuit by way of wires 10, 34 and contacts 35, 30. When the generator again reaches the normal speed required for charging the storage battery, the generator current becomes again predominant in auxiliary coil 24 and the relay again operates to close the generator circuits through contacts 8, 9 and storage battery 12, and also through contacts 29, 30 and consumption circuit 31, 32, 33.

If the storage battery is disconnected and there is no resistance in series with the shunt field, the voltage of the generator would be much higher than with the battery in circuit, due to the removal of the battery load and consequent increased amperage through the bucking coil of the generator.

To prevent this, my invention provides for arranging a resistance 27 in series with the shunt field coil 26. The value of this resistance is such as to limit the current flowing through main field coil 26 so that, at maximum speed of the generator, the field strength will be limited to that required for generating currents of safe voltage for use in the consumption circuit alone. This insures safe operation when the battery has been disconnected and its load removed from the generator circuit. But the full voltage of the generator is desirable and necessary when the storage battery is put back and connected in place, and I make this full voltage available by short-circuiting the resistance 27, thereby permitting unimpeded flow of current through the shunt field.

The action of the relay with the battery removed from the circuit will be as follows: Upon the generator being rotated and the resistance 27 connected in series with the shunt field 26 the current generated will be held down at maximum speed to a safe value so as not to burn out the lamps. When a voltage is attained sufficient to close the relay by means of the coil 40, the lamps will be connected in circuit with the generator exactly as is the case when the battery is in circuit, and the current consumed by the lamps passing through the series coil 24 of the relay will assist in holding the relay closed even on low generator speed. The bucking effect of the generator coil 6 would be practically nothing in this instance as there would be no current except the small amount used in the shunt coil of the relay 40 passing through the bucking coil 6.

The short circuiting of resistance 27 may be accomplished in any desired way but an important feature of my invention is arranging matters so that the short-circuiting will be effected only if and when the battery is connected in circuit and preferably not then unless the battery is also in proper place on the vehicle. This is accomplished by arranging the short-circuiting devices so that the circuit is completed by the act of connecting the terminals to the storage battery and by the act of putting the battery in its proper place.

The special terminal and special gravity operated switch which I have devised for opening and closing the short circuit are shown in Figs. 2 and 3 respectively.

In Fig. 2 the negative terminal of battery 12 is shown as a cone shaped binding post 13. The special detachable terminal connection therefor is shown as comprising a metallic ring 16 internally coned as at 18 to fit the upper portion of the binding post 13. The main circuit wire 14 is conductively connected with terminal 17, the latter being preferably cast integral with wire 14. There is a second conducting ring 17 coned to fit the post 13 at a lower point where the cone is thicker. This terminal has conductively connected with it, and preferably cast in it, the short circuiting wire 21. The two terminal rings 16, 17 are spaced apart, held in fixed relation, insulated from each other and externally protected by the non-conducting material 15. This material is preferably bakelite molded about the two terminals in the shape shown in the drawings. The special terminal or the post 13 may be tapered or retapered for perfect fit. The terminal is detachably secured to the post by means of the nut 23 which may be screwed down as tightly as necessary to perfect the wedging contact of ring terminals 16, 17 with post 13.

While it would be possible to have two independently movable terminals for the battery charging connection and the short circuiting connection respectively, it will be obvious that my special terminal has peculiar advantages which render it substantially fool-proof in the hands of careless or ignorant users. For instance, it is impossible to remove the main circuit contact without also removing the short-circuiting contact; when the terminal is removed the bakelite body prevents possibility of the ring contacts becoming short-circuited either by coming into contact with each other or with a third conducting body; and when the main circuit contact is replaced the short circuit is necessarily replaced with it.

The contact 16 and wire 21 are connected through wire 22 to the shunt field circuit at a point between resistance 27 and field coil 26. The short circuit from contact ring 16 to the other side of resistance 27 is completed through post 13, contact ring 16, wire 14, coil 24 and main circuit wire 25.

Obviously the above arrangement will be effective for opening the short circuit of the field resistance independently of any other means for opening the same circuit, which may or may not be arranged elsewhere in the system. In Figs. 1 and 3, I have shown another such means.

In these figures the battery 12 consisting of five cells, the end cells of which are provided with terminal binding posts 11, 13 is installed in a container 51 upon a vertically movable bottom plate 41 having a plunger 42 depending from the under side thereof through a hole 43 in the fixed bottom of the container. A casing 44 inclosing the plunger switch element is secured to the container 51. This casing 44 has a transverse member or members 45 through which the plunger 42 projects and upon which rests a compression spring 46 normally tending to raise the plunger out of the contacts 47 and 48 which are secured to but insulated from the casing 44. The plunger 42 is of conducting material and when in lower position, short circuits the contacts 47, 48. These contacts are equipped with circuit connections 49, 50 which extend downward through the casing and to which are connected the wires 21 and 22 respectively. The terminals 47 and 48 thus afford a gap in the short circuit of the shunt resistance 27 which gap will be automatically closed by placing the battery in position and automatically opened by the spring upon removing the battery.

When this battery controlled spring and gravity switch is employed in combination with the special terminal above described, it affords an additional protection, since short-circuiting of the shunt resistance and full voltage operation of the generator will be dependent both upon having the battery connected and upon having the battery in place. It is obvious, however, that from the practical viewpoint, the gravity switch when used alone for controlling the short circuit of the resistance will afford a very effective protection since in practice the user is not likely to start up his vehicle with his battery out of condition except when the battery has been both disconnected and removed. For the same reason it is practically permissible to use the special terminal in parallel with the gravity switch instead of having them in series with each other as above described.

In Fig. 4 the generator, storage battery, relay and circuit connections therefor may be substantially the same or similar to those shown in Fig. 1, except however, the special switch of Fig. 2 is not included, and instead of one lamp circuit, three lamp circuits are shown with their respective switches and each switch provided with an extra contact clip 58, 59 and 60 respectively. These extra clips are connected to different points of the resistance 27 by the leads 55, 56 and 57 respectively.

The wire 31, as in Fig. 1 constitutes the positive side of each of the three lamp circuits, while the wires 68, 69 and 70 constitute the negative sides of each circuit from the switches 65, 66 and 67.

The operation of the relay, generator and terminal are identical with the description of Fig. 1, the added feature of Fig. 4 being that when three circuits, such as the head, side and tail lamp circuits of an automobile are used, it might be desired at times to use one or more of such circuits, in which case a varied amount of resistance would be required in the shunt field of the generator, properly proportioned to the load imposed on the generator by whatever lamps were in use, said varied resistance to be such as to hold within proper limits the voltage of the generator when operating at maximum speed.

Therefore, the resistance 27 is connected at different points to contacts 58, 59 and 60, leading to the three lamp circuits shown. By this means, the greatest amount of resistance is inserted in the shunt field of the generator when the tail lamp circuit alone is in use, less resistance being inserted in the shunt field when the tail and side lamps are used, and the least resistance being inserted in the shunt field when all lamps are in use.

Thus it can be seen that by my invention one or more circuits and the generator field may be protected from the danger of excess voltage when the battery is removed from the circuit, as by the use of the terminal in Fig. 2, or the gravity switch in Fig. 3, or both, and a fixed resistance for the field connected in the way shown in Fig. 1 or the way shown in Fig. 4.

I do not wish to limit myself to any particular type of generator or relay, or constructional details of the terminal or switch shown, as any direct current generator having a shunt field may be employed, but the method of protecting the generator field and the lamp circuits from excess voltage, when the battery is removed from the generator circuit, is what I claim as my invention.

I claim:

1. In a system of the class described, a generator, a storage battery and a consumption circuit organized so that the generator will simultaneously energize the consumption circuit and charge the storage battery when the speed of the generator is sufficient for this purpose, in combination with means for protecting the consumption circuit when the storage battery is removed from its proper position, said means comprising a switch mechanically operated by the battery and regulating means whereby, when the storage battery is removed the generator current is limited to the requirements of the consumption circuit alone, and, whereby, when the storage battery is placed in its proper position and connected for being charged by the generator, the generator current will be increased sufficiently to meet the increased load.

2. In a system of the class described, a generator, a storage battery and a consumption circuit organized so that the generator will simultaneously energize the consumption circuit and charge the storage battery when the speed of the generator is sufficient for this purpose, in combination with means for protecting the consumption circuit when the storage battery is removed from its proper position, said means comprising a switch mechanically operated by the battery, and current regulating means, normally operating to limit the voltage of the current to the requirements of the consumption circuit alone, said switch rendering said current regulating means ineffective when the storage battery is in its proper position and connected for charging by the generator.

3. In a system of the class described, a generator, a storage battery and a consumption circuit organized so that the generator will simultaneously energize the consumption circuit and charge the storage battery when the speed of the generator is sufficient for this purpose, in combination with means for protecting the consumption circuit when the storage battery is removed from its proper position, said means comprising current regulating means, normally operating to limit the voltage of the current to the requirements of the consumption circuit alone, a switch mechanically operated by the battery for rendering said current regulating means ineffective when the storage battery is in its proper position and connected for charging by the generator and for rendering said current regulating means effective when the storage battery is lifted from its proper position.

4. In a system of the class described, a generator, a consumption circuit, a storage battery and means whereby the generator energizes the consumption circuit and storage battery in parallel when the speed of the generator is sufficient for simultaneously charging the storage battery and energizing the consumption circuit, and whereby at lower speeds, the generator is disconnected and the storage battery energizes the consumption circuit, in combination with current regulating means including a resistance in series with the shunt field of the generator, normally operating to limit the voltage of the current to the requirements of the consumption circuit alone, and a switch mechanically operated by the battery for rendering said current regulating means ineffective when the storage battery is in its proper position.

5. In a system of the class described, a generator, a consumption circuit, a storage battery and means whereby the generator energizes the consumption circuit and storage battery in parallel when the speed of the generator is sufficient for simultaneously charging the storage battery and energizing the consumption circuit, and whereby at lower speeds, the generator is disconnected and the storage battery energizes the consumption circuit, in combination with current regulating means, including a resistance in series with the shunt field of the generator, normally operating to limit the voltage of the current to the requirements of the consumption circuit alone, and a switch means operated mechanically by the battery for rendering said current regulating means effective when the storage battery is lifted from its proper position.

6. In a system of the class described, a generator, a consumption circuit, a storage battery and means whereby the generator energizes the consumption circuit and storage battery in parallel when the speed of the generator is sufficient for simultaneously charging the storage battery and energizing the consumption circuit, and whereby at lower speeds, the generator is disconnected and the storage battery energizes the consumption circuit, in combination with current regulating means, including a resistance in series with the shunt field of the generator, normally operating to limit the voltage of the current to the requirements of the consumption circuit alone, and a switch means mechanically operated by the battery for short circuiting said resistance when the battery is in position and a double contact terminal lug adapted to render said current regulating means ineffective when the storage battery is connected for charging by the generator.

7. In a system of the class described, a generator, a consumption circuit, a storage battery and means whereby the generator energizes the consumption circuit and storage battery in parallel when the speed of the generator is sufficient for simultaneously charging the storage battery and energizing the consumption circuit, and whereby at lower speeds, the generator is disconnected and the storage battery energizes the consumption circuit, in combination with current regulating means, including a resistance in series with the shunt field of the generator, normally operating to limit the voltage of the current to the requirements of the consumption circuit alone, a double contact terminal lug adapted to short circuit said resistance when said terminal lug is in connection with the terminals of the storage battery rendering said current regulating means ineffective and when the storage battery is disconnected to render effective the current regulating means.

8. In a generator storage battery and lighting system, a generator having a shunt field and three brushes, one of which is a positive, another of which is a negative and a third brush for the shunt field and the consumption circuit, a switch element composed of two contacts normally insulated from each other, means for conductively connecting said contacts, operated by the weight of the battery when in place, a resistance unit connected across the two contacts of said switch, a lead from one contact to the negative brush of the generator and a lead from the other contact to one end of the generator shunt field, a connection from the third generator brush to the other end of the shunt field, connections between the positive and negative poles respectively of the storage battery to the respective positive and negative brushes of the generator, and connections for the two sides of the consumption circuit respectively to the respective positive and negative brushes of the generator, so that when the battery is in place, the said resistance unit will be short circuited giving maximum field strength to the generator, and when the battery is removed the switch element will cause the current in the shunt field to flow through said resistance giving minimum field strength.

9. In a generator storage battery and lighting system, a generator having a shunt field and three brushes, one of which is a positive, another of which is a negative and a third brush for the shunt field and the consumption circuit, a switch element composed of two contacts normally insulated from each other, means for conductively connecting said contacts, operated by the weight of the battery when in place, a resistance unit connected across the two contacts of said switch, a lead from one contact to the negative brush of the generator and a lead from the other contact to one end of the generator shunt field, a connection from the third generator brush to the other end of the shunt field, connections between the positive and negative poles respectively of the storage battery to the respective positive and negative brushes of the generator, and connections for the two sides of the consumption circuit respectively to the respective positive and negative brushes of the generator, so that when the battery is in place, the said resistance unit will be short circuited giving maximum field strength to the generator, and when the battery is removed the switch element will cause the current in the shunt field to flow through said resistance giving minimum field strength, said consumption circuit being divided into sections arranged in parallel and having circuit closing devices whereby one or all of said parallel sections of the consumption circuit may be cut in or cut out, and said resistance unit having taps brought out at different points to separate contacts adjacent the respective switches so as to close circuit only a predetermined portion of the resistance in series with said shunt field whereby the resistance sections may be cut in and out of series relation with the shunt field when the corresponding section of the consumption circuit is cut in or out.

10. In a generator storage battery and lighting system, a generator having a shunt field and three brushes, one of which is a positive, another of which is a negative and a third brush for the shunt field and the consumption circuit, a terminal lug element composed of two contacts normally insulated from each other, means for conductively connecting said contacts operated by the battery terminal when said contacts are secured thereto, a resistance unit connected across the two contacts of said terminal lug, a lead from one contact to the negative brush of the generator and a lead from the other contact to one end of the generator shunt field, a connection from the third generator brush to the other end of the shunt field, connections between the positive and negative poles respectively of the storage battery to the respective positive and negative brushes of the generator, and connections for the two sides of the consumption circuit respectively to the respective positive and negative brushes of the generator, so that when the battery is connected in the generator circuit, the said resistance unit will be short circuited giving maximum field strength to the generator, and when the battery is removed the switch element will cause the current in the shunt field to flow through said resistance giving minimum field strength.

11. In a generator storage battery and lighting system, a generator having a shunt field and three brushes, one of which is a positive, another of which is a negative and a third brush for the shunt field and the consumption circuit, a terminal lug element composed of two contacts normally insulated from each other, means for conductively connecting said contacts operated by the battery terminal when said contacts are secured thereto, a resistance unit connected across the two contacts of said terminal lug, a lead from one contact to the negative brush of the generator and a lead from the other contact to one end of the generator shunt field, a connection from the third generator brush to the other end of the shunt field, connections between the positive and negative poles respectively of the storage battery to the respective positive and negative brushes of the generator, and connections for the two sides of the consumption circuit respectively to the respective positive and negative brushes of the generator, so that when the battery is connected in the generator circuit, the said resistance unit will be short circuited giving maximum field strength to the generator, and when the battery is removed the terminal lug element will cause the current in the shunt field to flow through said resistance giving minimum field strength, said consumption circuit being divided into sections arranged in parallel having circuit closing devices whereby one or all of said parallel sections of the consumption circuit may be cut in or cut out, and said resistance having taps brought out at different points to separate contacts adjacent the respective switches so as to close circuit only a predetermined portion of the resistance in series with said shunt field whereby the resistance sections may be cut in and out of series relation with the shunt field when the corresponding section of the consumption circuit is cut in or out.

12. A generator having a shunt field, a storage battery and a consumption circuit organized so that the generator will simultaneously energize the consumption circuit and charge the storage battery, in combination with means for protecting the consumption circuit when the storage battery load is removed from the circuit, said means including generator regulating means normally operating to limit the voltage of the generator current to the requirements of the consumption circuit alone and means for rendering said current regulating means effective when the storage battery is disconnected, said means including a double terminal for the storage battery comprising two separate contacts spaced apart and insulated from each other but adapted to be bridged by the battery terminal when secured in position thereon, one of said terminals being connected to the main charging circuit and the other to a circuit connection for controlling the operation of said regulating device.

13. A generator having a shunt field, a storage battery and a consumption circuit organized so that the generator will simultaneously energize the consumption circuit and charge the storage battery, in combination with means for protecting the consumption circuit when the storage battery load is removed from the circuit, said means including a resistance in series relation with the shunt field normally operating to limit the voltage of the generator current to the requirements of the consumption circuit alone and means for short circuiting said resistance when the storage battery is disconnected, said means including a double terminal for the storage battery comprising two separate contacts spaced apart and insulated from each other but adapted to be bridged by the battery terminal when secured in position thereon, one of said terminals being connected to the main charging circuit and the other to the shunt field circuit at a point between the field winding and the resistance.

Signed at West Orange, in the county of Essex and State of New Jersey, this 18th day of January, A. D. 1918.

JAMES KNOX ELDERKIN, Jr.